United States Patent
Yoshida et al.

(10) Patent No.: US 11,654,937 B2
(45) Date of Patent: May 23, 2023

(54) REPORTING DEVICE SENDING COLLISION INFORMATION BASED ON DRIVING MODE AND OCCUPANT PRESENCE

(71) Applicant: HONDA MOTOR CO., LTD., Tokyo (JP)

(72) Inventors: Suguru Yoshida, Wako (JP); Noriyuki Matsuda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 74 days.

(21) Appl. No.: 17/197,791

(22) Filed: Mar. 10, 2021

(65) Prior Publication Data

US 2021/0291871 A1 Sep. 23, 2021

(30) Foreign Application Priority Data

Mar. 23, 2020 (JP) .............................. JP2020-051210

(51) Int. Cl.
| | |
|---|---|
| *B60W 60/00* | (2020.01) |
| *B60W 50/14* | (2020.01) |
| *B60W 50/02* | (2012.01) |
| *B60W 40/08* | (2012.01) |

(52) U.S. Cl.
CPC ........ *B60W 60/0053* (2020.02); *B60W 40/08* (2013.01); *B60W 50/0205* (2013.01); *B60W 50/14* (2013.01)

(58) Field of Classification Search
None
See application file for complete search history.

(56) References Cited

U.S. PATENT DOCUMENTS

| | | | | |
|---|---|---|---|---|
| 9,646,428 | B1* | 5/2017 | Konrardy | G08B 25/08 |
| 10,579,055 | B2* | 3/2020 | Nagy | G05D 1/0061 |
| 10,699,580 | B1* | 6/2020 | Gross | H04W 4/90 |
| 2009/0051510 | A1* | 2/2009 | Follmer | H04W 4/027 |
| | | | | 340/901 |

(Continued)

FOREIGN PATENT DOCUMENTS

| | | |
|---|---|---|
| CN | 107507297 A | 12/2017 |
| CN | 107672597 A | 2/2018 |

(Continued)

OTHER PUBLICATIONS

Espacenet English Translation of DE102020107239A1 (Year: 2020).*
Chinese Office Action with English translation dated Jun. 1, 2022; 19 pages.

*Primary Examiner* — James J Lee
*Assistant Examiner* — Andrew Sang Kim
(74) *Attorney, Agent, or Firm* — Rankin, Hill & Clark LLP

(57) ABSTRACT

A reporting device includes an emergency reporting section that sends, to a response system via a communication control section, first emergency information including at least one of no-occupant information indicating that no occupant is present in a moving body and autonomous driving mode setting information indicating that the moving body is set in an autonomous driving mode when recognizing that a shock has occurred in the moving body based on shock occurrence information while it is recognized by a driving mode recognizing section that the moving body is set in the autonomous driving mode and it is recognized by an occupant recognizing section that no occupant is present in the moving body.

7 Claims, 3 Drawing Sheets

(56) References Cited

U.S. PATENT DOCUMENTS

2015/0221142 A1* 8/2015 Kim ................. H04N 7/188
　　　　　　　　　　　　　　　　　　　　　701/31.5
2018/0102001 A1* 4/2018 Faust ............... B60R 21/0132
2020/0334928 A1* 10/2020 Bourke .................. G06N 5/04

FOREIGN PATENT DOCUMENTS

| CN | 109421736 A | | 3/2019 |
|---|---|---|---|
| DE | 102020107239 A1 | * | 10/2020 |
| JP | 2016-149105 | | 8/2016 |

\* cited by examiner

US 11,654,937 B2

REPORTING DEVICE SENDING COLLISION INFORMATION BASED ON DRIVING MODE AND OCCUPANT PRESENCE

INCORPORATION BY REFERENCE

The present application claims priority under 35 U.S.C. § 119 to Japanese Patent Application No. 2020-051210 filed on Mar. 23, 2020. The content of the application is incorporated herein by reference in its entirety.

BACKGROUND OF THE INVENTION

Field of the Invention

The present invention relates to a reporting device.

Description of the Related Art

Conventionally, an in-vehicle human sensing system has been proposed in which information of warning, alert or the like is sent to a predetermined external receiver when a movement of a vehicle is recognized while no person is riding in the vehicle due to forgetting to pull the handbrake or the like (see Japanese Patent Laid Open No. 2016-149105, for example).

As a system for making reports from a vehicle to the outside as in the above-described in-vehicle human sensing system, an emergency call (eCall) system for automatically making emergency reports to accident response agencies such as a PSAP (Public Safety Answering Point), a call center, the police and an emergency center when detecting a collision of the vehicle has been conventionally developed. In addition, recent evolutions in autonomous driving technology have enabled unmanned traveling of vehicles by means of a remote driving system, an automated valet parking system and the like.

When a vehicle collides an obstacle during unmanned traveling of the vehicle and an emergency report is made, an accident response agency receiving the emergency report makes a call to the vehicle to check the conditions, but there will be no response because the vehicle is unmanned. Thus, the accident response agency determines that the driver is so injured that the driver cannot respond to the call, and calls an ambulance vehicle. In this case, there is a disadvantage that unnecessary emergency response is taken.

If an operation in which no emergency report is made for a vehicle during unmanned traveling is employed, an emergency report is not made when an accident in which the vehicle during unmanned traveling contacts a person outside the vehicle occurs, and there is a disadvantage that emergency response to the injured person outside the vehicle is delayed.

The present invention has been made in view of the above background and has an objective to provide a reporting device that can support appropriate emergency response to an accident of a moving body during unmanned and autonomous driving.

SUMMARY OF THE INVENTION

A first aspect for achieving the above objective is a reporting device used in a moving body capable of switching between an autonomous driving mode and a manual driving mode, the reporting device including: a driving mode recognizing section that recognizes whether the moving body is set in the autonomous driving mode or the manual driving mode; an occupant recognizing section that recognizes whether an occupant is present in the moving body; a shock occurrence information acquiring section that acquires shock occurrence information regarding a shock that has occurred in the moving body; a communication control section that controls communication with a predetermined response system; and an emergency reporting section that sends, to the response system via the communication control section, first emergency information including at least one of no-occupant information indicating that no occupant is present in the moving body and autonomous driving mode setting information indicating that the moving body is set in the autonomous driving mode when recognizing that a shock has occurred in the moving body based on the shock occurrence information while it is recognized by the driving mode recognizing section that the moving body is set in the autonomous driving mode and it is recognized by the occupant recognizing section that no occupant is present in the moving body.

In the above reporting device, the emergency reporting section may send the first emergency information to the response system when recognizing a shock at a level that is equal to or greater than a first predetermined level has occurred in the moving body based on the shock occurrence information while it is recognized by the driving mode recognizing section that the moving body is set in the autonomous driving mode, and the emergency reporting section may send second emergency information to the response system when recognizing that a shock at a level that is equal to or greater than a second predetermined level that is greater than the first predetermined level has occurred in the moving body based on the shock occurrence information while it is recognized by the driving mode recognizing section that the moving body is set in the manual driving mode.

In the above reporting device, the communication control section may perform communication control of a voice call with the response system, and the emergency reporting section may output a predetermined sound prompting a response to an interior of the moving body while voice call communication with the response system is established by the communication control section after sending the first emergency information to the response system.

In the above reporting device, the emergency reporting section may send first communication information based on the first emergency information to a user terminal used by a user of the moving body.

The above reporting device may include an autonomous driving notifying section that notifies an interior of the moving body that the moving body is in the autonomous driving mode when recognizing that the moving body is moving while it is recognized by the driving mode recognizing section that the moving body is set in the autonomous driving mode.

In the above reporting device, the response system may be a system operated by an emergency response agency.

In the above reporting device, the emergency response agency may be a PSAP (Public Safety Answering Point).

A second aspect for achieving the above objective is a reporting device used in a moving body capable of switching between an autonomous driving mode and a manual driving mode, the reporting device including: a driving mode recognizing section that recognizes whether the moving body is set in the autonomous driving mode or the manual driving mode; and an autonomous driving notifying section that notifies an interior of the moving body that the moving body is in autonomous driving operation when recognizing that the moving body is moving while it is recognized by the driving mode recognizing section that the moving body is set in the autonomous driving mode.

Advantageous Effects of Invention

According to the above reporting device, when the moving body in autonomous driving operation without occupants contacts an obstacle or the like and a shock occurs in the moving body, the first emergency information including at least one of the no-occupant information indicating that no occupant is present in the moving body and the autonomous driving mode setting information indicating that the moving body is set in the autonomous driving mode is sent to the response system.

In this manner, the response system can recognize that no occupant is present in the moving body, and thus it is possible to prevent unnecessary emergency response for first aid for occupants from being taken by the response system. In addition, the response system can recognize that it is impossible to check the conditions of the accident through a call with an occupant of the moving body, and thus can recognize whether there is an injured person outside the vehicle based on information such as traveling conditions of the vehicle at the time of occurrence of the accident sent from the vehicle and an image of the surrounding scene of the vehicle captured by a camera of the vehicle, to determine whether emergency response for first aid for the injured person outside of the vehicle is needed. Therefore, according to the above reporting device, it is possible to support appropriate emergency response to an accident of a moving body during unmanned and autonomous driving.

DETAILED DESCRIPTION OF THE PREFERRED EMBODIMENTS

1. Configuration of Vehicle

Figure 1:
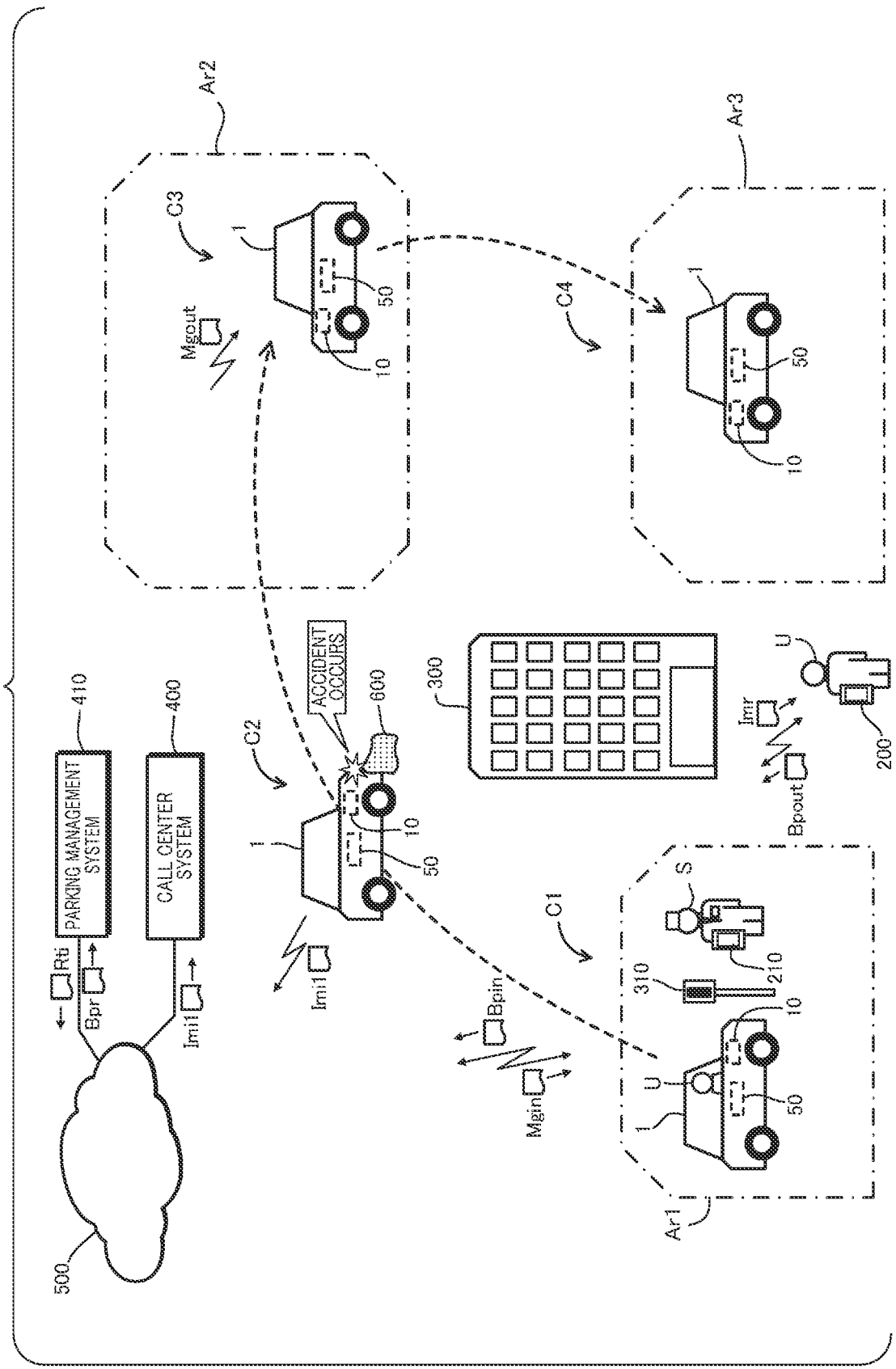
FIG. 1 is an illustrative diagram of emergency response in a case where an accident occurs to a vehicle during autonomous driving in an automated valet parking.

An automated valet parking service and a scheme of an emergency report in a case where an accident occurs to a vehicle during autonomous driving in an automated valet parking will be described with reference to FIG. 1. FIG. 1 shows a service scheme of an automated valet parking in which a vehicle 1 is delivered by means of autonomous driving between a check-in space Ar1 and a receiving space Ar3 for the vehicle and a vehicle keeping space Ar2 in an accommodation facility 300. A reception terminal 310 that receives a request of the automated valet parking is provided in the check-in space Ar1.

The vehicle 1 includes a vehicle control device 50 that controls the operation of the vehicle 1 and a reporting device 10 that makes an emergency report when a shock occurs in the vehicle 1. The vehicle control device 50 performs traveling control of the vehicle 1 in either a manual driving mode in which the travel of the vehicle 1 is controlled according to driving operations of a user U or an autonomous driving mode in which the travel of the vehicle 1 is controlled regardless of operations of the user U.

The vehicle 1 performs communication with a call center system 400 in which operators and operating systems are placed, a parking management system 410, the reception terminal 310, a user terminal 200 used by the user U, and the like via a communication network 500. The call center system 400 may be a system such as a PSAP (Public Safety Answering Point), an insurance company, a security company, or a manager/owner of the vehicle, each of which corresponds to the response system in the present invention. The PSAP is an emergency response agency.

The parking management system 410 manages the operation of the automated valet parking, and accepts check-in of the vehicle 1 by the automated valet parking by receiving check-in request information Bpin sent from the vehicle 1 arriving at the check-in space Ar1 as shown by C1. Note that the user U can send the check-in request information Bpin by operating the user terminal 200 or can send the check-in request information Bpin by operating the reception terminal 310. The user U can also request the check-in of the vehicle 1 to an operator S of the valet parking. In this case, the check-in request information Bpin is sent from an operator terminal 210 used by the operator S to the parking management system 410.

When receiving the check-in request information Bpin, the parking management system 410 extracts a vacant space in the vehicle keeping space Ar2 and assigns it to the vehicle 1. The parking management system 410 then sends, to the vehicle 1, movement guidance information Mgin including information (such as a position or an identification number) of the assigned parking space, information of a route to the assigned parking space, and the like.

When the vehicle 1 receives the movement guidance information Mgin, the vehicle control device 50 sets the vehicle 1 in the autonomous driving mode, and controls the vehicle 1 to autonomously travel to the vehicle keeping space Ar2 based on the movement guidance information Mgin to park the vehicle 1 in the assigned parking space as shown by C3.

To receive the vehicle, the user U operates the user terminal 200 to send reception request information Bpout to the parking management system 410. When receiving the reception request information Bpout, the parking management system 410 sends, to the vehicle 1, movement guidance information Mgout including information of a route to the receiving space Ar3 and the like.

The vehicle control device 50 of the vehicle 1 receiving the movement guidance information Mgout sets the vehicle 1 in the autonomous driving mode, and controls the vehicle 1 to autonomously travel to the receiving space Ar3 based on retrieval instruction information. In this manner, the user U can receive the vehicle 1.

As shown by C2, the reporting device 10 provided in the vehicle 1 sends first emergency information Imi1 to the call center system 400 when recognizing a shock that has occurred in the vehicle 1 as a result of an accident such as contact of the vehicle 1 with an obstacle 600 while traveling in the autonomous driving mode. The first emergency information Imi1 includes at least one of no-occupant information indicating that no occupant is present in the vehicle 1 and autonomous driving mode setting information indicating that the vehicle 1 is set in the autonomous driving mode, as well as an MSD (Minimum set of Data) including a location (latitude and longitude) at which the accident has occurred, the orientation of the vehicle 1, the form of the vehicle 1 and the like.

The call center system 400 receiving the first emergency information Imi1 can recognize that no occupant is present in the vehicle 1, and thus high priority matters in accident response can be determined by the call center system 400. For example, unnecessary response for first aid for occupants is avoided. In addition, the call center system 400 can check whether a situation that requires emergency response occurs, such as a situation in which a person outside the vehicle is injured by contacting the vehicle 1, by requesting connection to an out-of-vehicle camera 60 of the vehicle 1 and acquiring an image of the surrounding scene of the vehicle 1 captured by the out-of-vehicle camera 60. In addition, the reporting device 10 sends communication information Imr based on the first emergency information Imi1 to the user terminal 200 to inform the user U that an accident of the vehicle 1 has occurred.

2. Reporting Device and Configuration of Reporting Device

Configurations of the reporting device 10 and the vehicle 1 provided with the reporting device 10 will be described with reference to FIG. 2. The vehicle 1 includes the reporting device 10, the vehicle control device 50, the out-of-vehicle camera 60, a radar 61, an in-vehicle camera 70, a microphone 71, a speaker 72, an operation switch 73, a touch panel 74, a shock sensor 80, a speed sensor 81, an acceleration sensor 82, an angular speed sensor 83, a driving section 90, a braking section 91, a steering section 92, a navigation device 100, and a communication unit 110, which are communicatively connected by a CAN (Controller Area Network) 5.

The out-of-vehicle camera 60 is provided at the front, rear, left and right of the vehicle 1, for example, and captures the surrounding scene of the vehicle 1. The radar 61 detects the position of an object present in front of the vehicle 1. The in-vehicle camera 70 captures an image of the interior of the cabin of the vehicle 1. The microphone 71 collects sounds inside the cabin of the vehicle 1. The speaker 72 outputs sounds toward the interior of the cabin. The operation switch 73 is operated by the user U and accepts setting of various functions and the like of the vehicle 1. The touch panel 74 displays information to occupants of the vehicle 1 accepts touch operations of occupants.

The shock sensor 80 detects a shock that occurs in the vehicle 1. The shock sensor 80 may be incorporated in an airbag (not shown). The speed sensor 81 detects the traveling speed of the vehicle 1. The acceleration sensor 82 detects the acceleration of the vehicle 1. The angular speed sensor 83 detects the angular speed of the vehicle 1. The driving section 90, the braking section 91 and the steering section 92 perform driving, decelerating and steering of the vehicle 1, respectively.

The navigation device 100 includes a GPS (Global Positioning System) sensor 101 that detects the current position of the vehicle 1 and map data 102, and performs guidance for travel along a route to a destination and the like. The communication unit 110 performs communication with the user terminal 200, the operator terminal 210, the reception terminal 310, the call center system 400, the parking management system 410 and the like shown in FIG. 1.

The vehicle control device 50 is a control unit composed of a CPU (Central Processing Unit), a memory and the like (not shown). The vehicle control device 50 switches between the manual driving mode and the autonomous driving mode according to driving mode setting operations of the user U, for example. In the manual driving mode, the vehicle control device 50 controls the travel of the vehicle 1 according to driving operations of the user U. In the autonomous driving mode, the vehicle control device 50 controls the travel of the vehicle 1 regardless of operations of the user U.

In the autonomous driving mode, the vehicle control device 50 controls the vehicle 1 to autonomously travel by controlling the operation of the driving section 90, the braking section 91, and the steering section 92 based on surrounding conditions of the vehicle 1 recognized by the out-of-vehicle camera 60 and the radar 61, traveling conditions of the vehicle 1 detected by the speed sensor 81, the acceleration sensor 82, and the angular speed sensor 83, road conditions on which the vehicle 1 is traveling detected by the navigation device 100, traffic conditions received by the communication unit 110, and the like.

Note that some or all of the functions of the vehicle control device 50 may be outside the vehicle 1, and a so-called remote driving system in which the vehicle 1 is operated based on operation of an external management device via the communication unit 110 may be used. The remote driving scheme in which the vehicle 1 is driven by an external operator also corresponds to the autonomous driving mode in the present invention.

The reporting device 10 is a control unit composed on a CPU 20, a memory 30 and the like. The CPU 20 functions as the communication control section 21, the driving mode recognizing section 22, the occupant recognizing section 23, the shock occurrence information acquiring section 24, the emergency reporting section 25, and the autonomous driving notifying section 26 by reading and executing a program 31 for controlling the reporting device 10 stored in the memory 30.

The communication control section 21 performs control of communication with the user terminal 200, the operator terminal 210, the reception terminal 310, the call center system 400, the parking management system 410 and the like via the communication unit 110. The driving mode recognizing section 22 recognizes whether the vehicle 1 is set in the manual driving mode or the autonomous driving mode by communicating with the vehicle control device 50. The occupant recognizing section 23 recognizes whether an occupant is present in the vehicle 1 based on an image of the interior of the cabin of the vehicle 1 captured by the in-vehicle camera 70. Note that whether an occupant is present in the vehicle 1 may be recognized based on information detected by a seatbelt switch (not shown) on whether a seatbelt is worn, information detected by a seating sensor (not shown) on whether a person is seated, or the like.

The shock occurrence information acquiring section 24 acquires shock occurrence information indicating a level of a shock detected by the shock sensor 80 directly from the shock sensor 80 or via the vehicle control device 50. The emergency reporting section 25 sends first collision information to the call center system 400 via the communication control section 21 and the communication unit 110 when a shock at a level that is equal to or greater than a first predetermined level is detected by the shock sensor 80 while the vehicle 1 is set in the autonomous driving mode.

The emergency reporting section 25 sends second collision information to the call center system 400 via the communication control section 21 and the communication unit 110 when a shock at a level that is equal to or greater than a second predetermined level is detected by the shock sensor 80 while the vehicle 1 is set in the manual mode. The second predetermined level may be the same as the first predetermined level or may be different from the first predetermined level. The second predetermined level may be changed as appropriate. For example, the second predetermined level may be set to a shock level that is greater than the first predetermined level when the vehicle 1 and the call center system 400 communicate with each other in a situation where the vehicle 1 travels in an unmanned operation when it is estimated by a vehicle sensor or a management device outside the vehicle that no person is present inside and outside the vehicle 1 or in an unmanned space, or the second predetermined level may be set at a shock level that is less than the first predetermined level in a situation where it is estimated that the vehicle 1 travels in an unmanned operation in a manned space.

The autonomous driving notifying section 26 notifies the interior of the cabin that the vehicle 1 is set in the autonomous driving mode at a predetermined timing when the vehicle 1 is set in the autonomous driving mode and travels in autonomous driving. For example, a timing when the vehicle 1 starts autonomous driving, a timing when a predetermined period of time has elapsed after the vehicle 1 starts autonomous driving, a timing when a sound is input to the microphone 71 during autonomous driving, or the like may be set as the predetermined timing. The autonomous driving notifying section 26 notifies the interior of the cabin that the autonomous driving mode is set by displaying a notification screen on the touch panel 74, outputting a guidance sound from the speaker, or the like.

3. Emergency Reporting Process

An emergency reporting process performed by the reporting device 10 will be described with reference to a flow chart shown in FIG. 3. In step S1 in FIG. 3, the shock occurrence information acquiring section 24 acquires shock occurrence information including information of a level of a shock that has occurred in the vehicle 1 and is detected by the shock sensor 80.

In subsequent step S2, the emergency reporting section 25 recognizes whether the vehicle 1 is set in the autonomous driving mode by communicating with the vehicle control device 50. Then, the emergency reporting section 25 advances the process to step S3 when the vehicle 1 is set in the autonomous driving mode, and advances the process to step S20 when the vehicle 1 is not set in the autonomous driving mode (is set in the manual driving mode).

In step S3, the autonomous driving notifying section 26 notifies the interior of the cabin of the vehicle 1 that the vehicle 1 is set in the autonomous driving mode at the predetermined timing as described above. In this manner, when the vehicle 1 is autonomously traveling in the autonomous driving mode and occupants other than the driver do not recognize that the vehicle 1 is in autonomous driving operation, the occupants can recognize that the vehicle 1 is in autonomous driving operation, so that it is possible to prevent the occupants from being anxious.

Subsequent steps S4 to S10 are processes for responding to an accident that has occurred while the autonomous driving mode is set. In step S4, the emergency reporting section 25 determines whether a shock at a level that is equal to or greater than the first predetermined level is recognized based on the shock occurrence information. Then, the emergency reporting section 25 advances the process to step S5 when a shock at a level that is equal to or greater than the first predetermined level is recognized, and advances the process to step S1 when a shock at a level that is equal to or greater than the first predetermined level is not recognized.

In step S5, the occupant recognizing section 23 recognizes whether an occupant is present in the vehicle 1. In next step S6, the occupant recognizing section 23 advances the process to step S21 when recognizing that no occupant is present in the vehicle 1, and advances the process to step S7 when recognizing that an occupant is present in the vehicle 1.

In step S7, the emergency reporting section 25 sends the first emergency information to the call center system 400 via the communication control section 21 and the communication unit 110. As described above, the first emergency information includes at least one of the no-occupant information indicating that no occupant is present in the vehicle 1 and the autonomous driving mode setting information indicating that the vehicle 1 is set in the autonomous driving mode as well as the MSD.

In next step S8, the emergency reporting section 25 sends communication information based on the first emergency information to the user terminal 200 (see FIG. 1) via the communication control section 21 and the communication unit 110. The user U can recognize that the accident of the vehicle 1 has occurred by checking the communication information on the user terminal 200.

In subsequent step S9, the emergency reporting section 25 establishes voice call communication with the call center system 400 via the communication control section 21 and the communication unit 110. Then, in next step S10, the emergency reporting section 25 outputs a sound prompting a response such as "Is anyone there?" from the speaker 72.

Here, since no occupant is recognized in step S6, basically there is no response from occupants. However, when it is difficult to recognize whether an occupant is present such as in the nighttime, the occupant recognizing section 23 may mistakenly recognize that no occupant is present even though an occupant is actually present. Thus, a sound prompting a response is output from the speaker 72 to make occupants notice that it is estimated by the call center system 400 that the vehicle is unmanned. For example, both of the response-prompting sound output from the speaker 72 and a response sound indicating the occupant's intention such as "One person is riding in the vehicle and is injured." are collected by the microphone 71 and sent to the call center system 400, so that the call center system 400 can be informed that the occupant is present in the vehicle 1.

Next, steps S20 to S21 are processes for responding to an accident that has occurred during manual driving mode. In step S20, the emergency reporting section 25 determines whether a shock at a level that is equal to or greater than the second predetermined level is recognized based on the shock occurrence information. Then, the emergency reporting section 25 advances the process to step S21 when a shock at a level that is equal to or greater than the second predetermined level is recognized, and advances the process to step S1 when a shock at a level that is equal to or greater than the second predetermined level is not recognized.

In step S21, the emergency reporting section 25 sends second emergency information to the call center system 400 via the communication control section 21 and the communication unit 110. The second emergency information includes the MSD. In subsequent step S22, the emergency reporting section 25 establishes voice call communication with the call center system 400 via the communication control section 21 and the communication unit 110.

An operator of the call center system 400 performs a voice call with an occupant of the vehicle 1 to recognize injury conditions of the occupant and the like, and performs emergency response such as calling an ambulance vehicle.

4. Other Embodiments

Although in the above embodiment, the four-wheeled vehicle 1 is illustrated as an example of the moving body in the present invention, the present invention can be applicable to various moving bodies for passenger use such as a two-wheeled vehicle, a flying vehicle, or a ship.

Figure 3:
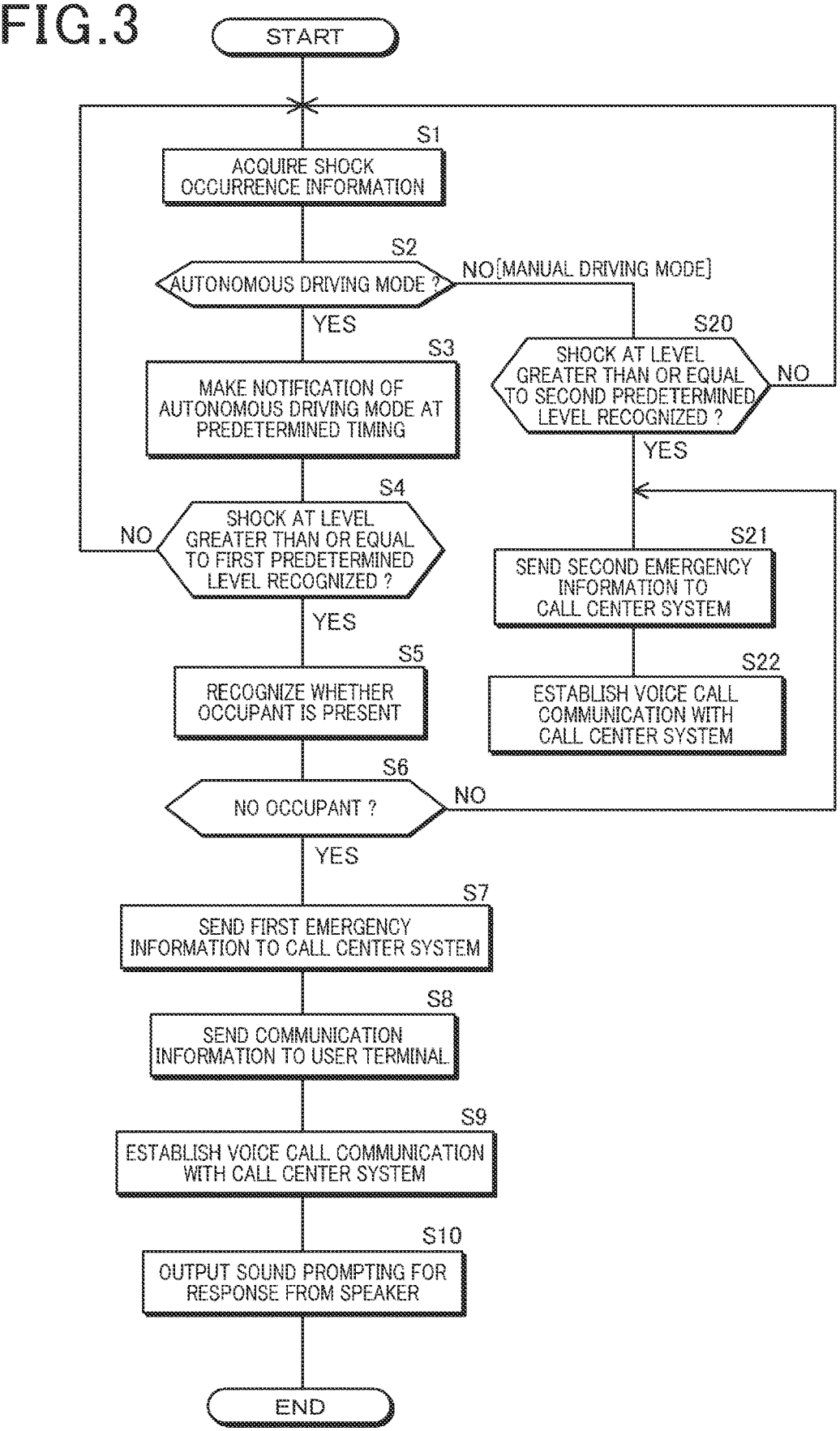
FIG. 3 is a flow chart of an emergency reporting process.

Although in the above embodiment, a shock determination level (first predetermined level) in the autonomous driving mode and a shock determination level (second predetermined level) in the manual driving mode are set to different levels in the processes of steps S2, S4 and S20 in FIG. 3, they may be set to the same level.

Although in the above embodiment, the emergency reporting section 25 outputs a sound prompting a response to the interior of the cabin in step S10 of FIG. 3 when recognizing a shock at a level that is equal to or greater than the first predetermined level while the autonomous driving mode is set, this process may be omitted.

Although in the above embodiment, the emergency reporting section 25 sends the communication information to the user terminal 200 in step S8 of FIG. 3, this process may be omitted.

Although in the above embodiment, the autonomous driving notifying section 26 is provided and notifies the interior of the cabin that the autonomous driving mode is set in step S3 of FIG. 3 when the autonomous driving mode is set, this process may be omitted. The process of the autonomous driving notifying section 26 may be separately performed in a manner independent of the process for the case where a shock occurs in the vehicle 1.

In the above embodiment, the call center system 400 is illustrated as an example of the response system in the present invention. The call center system 400 may be an accident response agency such as a PSAP, the police, or an emergency center as an emergency response agency, or a system such as an insurance company, a manager of the vehicle, a security company, or a manager of a region in which the vehicle is present.

Figure 2:
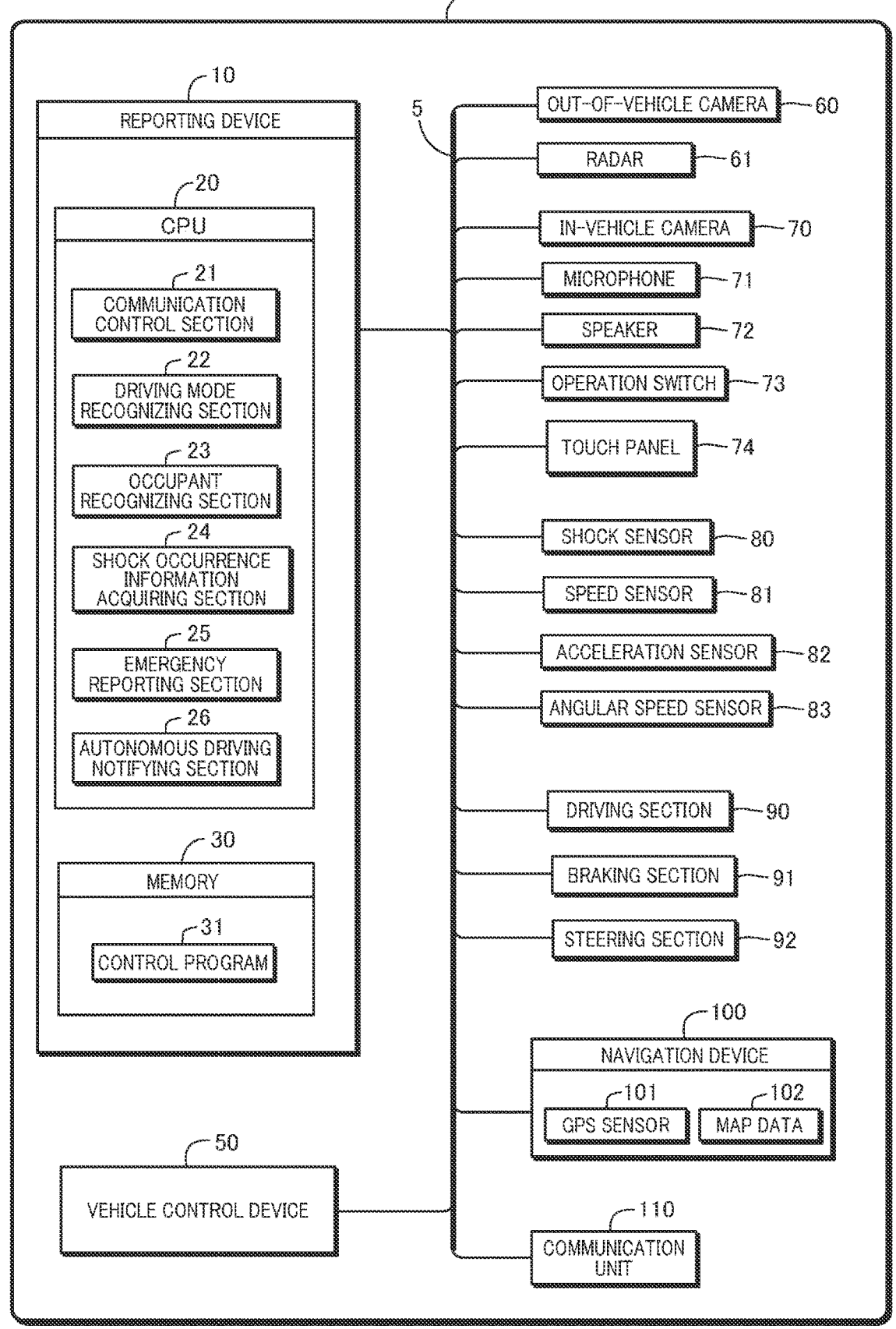
FIG. 2 is a configurational view of a reporting device and a vehicle provided with the reporting device.

Note that FIG. 2 is a schematic diagram in which the components of the vehicle 1 and the reporting device 10 are divided by major processes for easy understanding of the invention of the present application, and the components of the vehicle 1 and the reporting device 10 may be configured by other division. The respective processes of the components may be performed by one hardware unit, or may be performed by a plurality of hardware units. The respective processes of the components in the flow chart shown in FIG. 3 may be performed by one program, or may be performed by a plurality of programs.

5. Configurations Supported by Above Embodiment

The above embodiment is a specific example of the following configurations.

(First Item) A reporting device used in a moving body capable of switching between an autonomous driving mode and a manual driving mode, the reporting device comprising: a driving mode recognizing section that recognizes whether the moving body is set in the autonomous driving mode or the manual driving mode; an occupant recognizing section that recognizes whether an occupant is present in the moving body; a shock occurrence information acquiring section that acquires shock occurrence information regarding a shock that has occurred in the moving body; a communication control section that controls communication with a predetermined response system; and an emergency reporting section that sends, to the response system via the communication control section, first emergency information including at least one of no-occupant information indicating that no occupant is present in the moving body and autonomous driving mode setting information indicating that the moving body is set in the autonomous driving mode when recognizing that a shock has occurred in the moving body based on the shock occurrence information while it is recognized by the driving mode recognizing section that the moving body is set in the autonomous driving mode and it is recognized by the occupant recognizing section that no occupant is present in the moving body.

According to the reporting device of the first item, when the moving body in autonomous driving operation without occupants contacts an obstacle or the like and a shock occurs in the moving body, the first emergency information including at least one of the no-occupant information indicating that no occupant is present in the moving body and the autonomous driving mode setting information indicating that the moving body is set in the autonomous driving mode is sent to the response system. In this manner, the response system can recognize that no occupant is present in the moving body, and thus the response system can appropriately determine the priority to take a response.

(Second Item) The reporting device according to the first item, wherein the emergency reporting section sends the first emergency information to the response system when recognizing a shock at a level that is equal to or greater than a first predetermined level has occurred in the moving body based on the shock occurrence information while it is recognized by the driving mode recognizing section that the moving body is set in the autonomous driving mode, and the emergency reporting section sends second emergency information to the response system when recognizing that a shock at a level that is equal to or greater than a second predetermined level that is greater than the first predetermined level has occurred in the moving body based on the shock occurrence information while it is recognized by the driving mode recognizing section that the moving body is set in the manual driving mode.

According to the reporting device of the second item, even when a small shock occurs during unmanned and autonomous driving, sending the first emergency information to the response system enables a quick response.

(Third Item) The reporting device according to the first item or the second item, wherein the communication control section performs communication control of a voice call with the response system, and the emergency reporting section outputs a predetermined sound prompting a response to an interior of the moving body while voice call communication with the response system is established by the communication control section after sending the first emergency information to the response system.

According to the reporting device of the third item, when the occupant recognizing section mistakenly recognizes whether an occupant is present, the response system can recognize whether an occupant is present in the moving body based on whether a response sound to the output predetermined sound is received.

(Fourth Item) the reporting device according to any one of the first item to the third item, wherein the emergency reporting section sends first communication information based on the first emergency information to a user terminal used by a user of the moving body.

According to the reporting device of the fourth item, the user of the moving body can be informed that an accident of the moving body has occurred.

(Fifth Item) The reporting device according to any one of the first item to the fourth item, comprising: an autonomous driving notifying section that notifies an interior of the moving body that the moving body is in the autonomous driving mode when recognizing that the moving body is moving while it is recognized by the driving mode recognizing section that the moving body is set in the autonomous driving mode.

According to the reporting device of the fifth item, by notifying an occupant of the moving body who is unaware of the autonomous driving that the moving body is in the autonomous driving mode, it is possible to prevent the occupant from being anxious.

(Sixth Item) The reporting device according to any one of the first item to the fifth item, wherein the response system is a system operated by an emergency response agency.

According to the reporting device of the sixth item, it is possible to prevent unnecessary emergency response for first aid for occupants of the unmanned moving body from being taken by the emergency response agency.

(Seventh Item) The reporting device according to the sixth item, wherein the emergency response agency is a PSAP (Public Safety Answering Point).

According to the reporting device according to the sixth item, it is possible to prevent unnecessary emergency response for first aid for occupants of the unmanned moving body from being taken by the PSAP.

(Eighth Item) A reporting device used in a moving body capable of switching between an autonomous driving mode and a manual driving mode, the reporting device comprising: a driving mode recognizing section that recognizes whether the moving body is set in the autonomous driving mode or the manual driving mode; and an autonomous driving notifying section that notifies an interior of the moving body that the moving body is in autonomous driving operation when recognizing that the moving body is moving while it is recognized by the driving mode recognizing section that the moving body is set in the autonomous driving mode.

According to the reporting device of the eighth item, by notifying an occupant of the moving body who is unaware of the autonomous driving that the moving body is in autonomous driving operation, it is possible to prevent the occupant from being anxious.

REFERENCE SIGNS LIST

1 . . . vehicle, 10 . . . reporting device, 20 . . . CPU, 21 . . . communication control section, 22 . . . driving mode recognizing section, 23 . . . occupant recognizing section, 24 . . . shock occurrence information acquiring section, 25 . . . emergency reporting section, 26 . . . autonomous driving notifying section, 50 . . . vehicle control device, 80 . . . shock sensor, 110 . . . communication unit, 200 . . . user terminal, 400 . . . call center system, U . . . user

What is claimed is:

1. A reporting device provided in a moving body capable of switching between a manual driving mode in which a travel of the moving body is controlled according to driving operations of a user and an autonomous driving mode in which the travel of the moving body is controlled regardless of operations of the user, the reporting device comprising a CPU, wherein the CPU:
   via a communication network, communicates with a predetermined response system and a user terminal used by the user,
   recognizes whether the moving body is set in the autonomous driving mode or the manual driving mode;
   recognizes whether or not the moving body is in an unmanned operation state in which the moving body travels in a state which no person is present inside the moving body;
   acquires shock occurrence information regarding a shock that has occurred in the moving body;
   controls communication with the response system and the user terminal;
   sends, to the response system, first emergency information including no-occupant information indicating that the moving body is in the state which no person is present inside the moving body and autonomous driving mode setting information indicating that the moving body is set in the autonomous driving mode when recognizing that a shock at a level that is equal to or greater than a first determined level has occurred in the moving body based on the shock occurrence information while it is recognized that the moving body is set in the autonomous driving mode and it is in the moving body is in the unmanned operation state;
   after the first emergency information is sent to the response system, sends first communication information that is based on the first emergency information to the user terminal; and
   sends, to the response system, second emergency information when recognizing that a shock at a level that is equal to or greater than a second determined level has occurred in the moving body based on the shock occurrence information while it is recognized that the moving body is set in the manual driving mode.

2. The reporting device according to claim 1, wherein the CPU in the manual driving mode, sets the second predetermined level greater than the first predetermined level.

3. The reporting device according to claim 1, wherein the CPU, in the unmanned operation state, sets the second predetermined level greater than the first predetermined level when no person is present inside and within a predetermined range outside the moving body in the unmanned operation state, and sets the second predetermined level less than the first predetermined level when a person is present outside the moving body.

4. The reporting device according to claim 1, wherein the CPU performs communication control of a voice call with the response system, and
   outputs a predetermined sound prompting a response to an interior of the moving body while voice call communication with the response system is established after sending the first emergency information to the response system.

5. The reporting device according to claim 1, wherein:
   the CPU notifies an interior of the moving body that the moving body is in the autonomous driving mode when recognizing that the moving body is moving while it is recognized that the moving body is set in the autonomous driving mode.

6. The reporting device according to claim 1, wherein the response system is a system operated by an emergency response agency.

7. The reporting device according to claim 6, wherein the emergency response agency is a PSAP (Public Safety Answering Point).

* * * * *